United States Patent [19]

Takarabe et al.

[11] Patent Number: 4,914,142

[45] Date of Patent: Apr. 3, 1990

[54] METHOD OF PRODUCING EMULSION POLYMER

[75] Inventors: Kunihide Takarabe; Shinichi Kuwamura, all of Izumi-ohtsu, Japan

[73] Assignee: Dainippon Ink and Chemicals, Inc., Tokyo, Japan

[21] Appl. No.: 195,864

[22] Filed: May 19, 1988

[30] Foreign Application Priority Data

May 19, 1987 [JP] Japan ................................ 62-120229

[51] Int. Cl.$^4$ ........................ C08F 2/22; C08F 291/00; C08F 251/00; C08K 5/04
[52] U.S. Cl. .................................... 523/511; 523/205; 523/504; 524/296; 524/297; 524/308; 524/312; 524/313; 524/314; 524/376; 524/377; 524/378; 524/384; 524/386; 524/390; 524/391; 524/458; 524/460; 524/529; 525/242; 525/244; 525/258; 525/445; 525/455
[58] Field of Search .............. 524/458, 377, 308, 314, 524/529, 460, 312, 313, 384, 296, 297, 376, 386, 378, 390, 391; 525/244, 258, 902, 242, 445, 455; 523/205, 511, 504

[56] References Cited

U.S. PATENT DOCUMENTS

| 4,186,120 | 1/1980 | Vgelstad | 524/458 |
| 4,459,378 | 7/1984 | Vgelstad | 524/458 |
| 4,530,956 | 7/1985 | Vgelstad et al. | 524/458 |
| 4,694,035 | 9/1987 | Kasai et al. | 524/458 |

FOREIGN PATENT DOCUMENTS

| 97582 | 8/1979 | Japan . | |
| 0067647 | 4/1982 | Japan | 524/458 |
| 0144694 | 8/1984 | Japan | 524/458 |

Primary Examiner—Herbert J. Lilling
Attorney, Agent, or Firm—Sherman and Shalloway

[57] ABSTRACT

A method of producing an emulsion polymer which comprises adding a polymerizable monomer to an emulsion polymer containing a high-molecular-weight compound having a weight average molecular weight of 20,000 to 2,000,000 as a seed polymer, the amount of the unsaturated monomer being 1.5 to 9.5 times the total volume of the solids in the emulsion polymer, and thereafter, polymerizing the monomer in the presence of a film-forming aid.

12 Claims, No Drawings

METHOD OF PRODUCING EMULSION POLYMER

This invention relates to a novel process for producing an emulsion polymer. More specifically, this invention relates to a novel and useful process for producing an emulsion polymer, which comprises causing an emulsion polymerization dispersion containing a specific high-molecular-weight compound as a seed polymer to absorb a specific amount of a polymerizabe unsaturated monomer, and thereafter polymerizing the unsaturated monomer in the preseence of a film-forming aid.

With an expansion of the utility of emulsion polymers in recent years, they have been required to have various properties. One important property among them is the monodispersity of the polymer particles, but no method has yet been established which can strictly control the particle diameter and particle size distribution of polymer particle. Desirably, to improve flowability or for use as a matt agent, the emulsion polymers should have a larger particle diameter and a narrower particle size distribution than rodinary emulsion polymer particles.

One method now in practice of producting an emulsion polymer of a large particle diameter is to polymerize a polymerizable unsaturated monomer in the presence of an electrolyte. Since, however, the amount of the electrolyte than can be added is naturally limited, the particle diameters can be controlled only to a limited extent. Furthermore, the remaining electrolyte may exert deleterious effects, for examle the degradation of properties such as water resistance of the emulsion film, on the resulting polymer.

Methods of obtaining mono-disperse emulsion polymers of a large particle diameter are proposed, for example, in Japanese Laid-Open Patent Publications Nos. 97583/1979, 126288/1979 and 206803/1980.

The method described in Japanese Laid-Open Patent Publication No. 97582/1979 comprises synthesizing a polymer (seed polymer) of a much lower molecular weight than ordinary polymer latices by adding a chain transfer agent during polymerization, causing the seed polymer to absorb a slightly water-soluble polymerizable unsaturated monomer, and then polymerizing the unsaturated monomer. If this polymerization is carried out by using such an oil-soluble or water-soluble polymerization initiator as is used normally, a coagulum or new particles may result, and it is difficult to obtain a monodisperse emulsion polymer of a large particle diameter stably in good yields.

The method described in Japanese Laid-Open Patent Publication No. 126288/1979 involves a first step wherein a seed polymer is caused to absorb a difficultly water-soluble organic compound having a water solubility ower than $10^{31 2}$ g/liter of $H_2O$ and a second step wherein the seed polymer is caused to absorb a slightl water-soluble monomer in an amount of as large as 100-fold to form swollen particles and then the absorbed monomer is polymerized in the presence of a water-soluble or oil-soluble polymerization initiator while maintaining the monomer in the particulate form. If, however, when the polymerization is carried out using the oil-soluble initiator, the monomer phase which does not participate in the swelling of the seed polymer is also polymerized so that a large amount of a coagulum forms and the yield of the polymer is decreased. In addition, when a low-molecular-weight substance is used as the seed particles, the resulting emulsion polymer is likely to have lowered durability.

The method described in Japanese Laid-Open Patent Publication No. 206803/1980 comprises a first step wherein a seed polymer is caused to absorb a difficultly water-soluble organic compound having a water solubility lower than $10^{-2}$ g/liter of $H_2O$ and a second step wherein the seed polymer is caused to absorb a monomer in an amount of as large as 10- to 400-fold to form swollen particles and then the absorbed monomer is polymerized in the presence of a redox-system radical polymerization initiator in an emulsifier concentration below the critical micelle concentration while maintaining the monomer in the particulate form. Since a large amount of the monomer is added to a small amount of the seed particles in this method, that portion of the monomer which is not absorbed by the seed polymer exists in a large amount and is polymerized by the redox-system radical polymerization initiator. As a result, as in the aforesaid method, a large amount of a coagulum results and the yield of the polymer is decreased.

Another method of producing a highly monodisperse emulsion polymer having a large particle diameter is to expand seed particles gradually to a larger size and then perform polymerization. According to this method, an emulsifier and a monomer must be added stepwise. The process steps therefore become complex, and the particle size distribution of the resulting particles is liable to become broad.

It is an object of this invention to remedy the various defects of the prior art described above and to provide a method by which a highly monodisperse emulsion polymer having a large particle diameter can be produced while the occurrence of a coagulum or new particles during the polymerization is inhibited to a low level.

In accordance with this invention, this object is achieved by a method of producing an emulsion polymer which comprises adding a polymerizable monomer to an emulsion polymer containing a high-molecular-weight compound having a weight average molecular weight of 20,000 to 2,000,000 as a seed polymerm, in the amount of the monomer 1.5 to 9,5 times the total volume of the solids in the emulsion polymer, and thereafter, polymerizing the monomer in the presence of a film-forming aid.

The high-molecular-weight compound having a weight average molecular weight of 20,000 to 2,000,000 used as the seed polymer in this invention is an emulsion polymer not containing a polyfunctional crosslinkable monomer or a chain transfer agent. It is critical that the seed polymer should be easy to plasticize by the film-forming aid to assume a structure peritting easy absorption of a polymerizable unsaturated monomer. A specific method of imparting this structure may, for example, be to use the lowest necessary amount of the emulsifier so as to inhibit formation of an aggregate or a coagulum and perform the polymerization under the aforesaid conditions by an ordinary emulsion-polymerization method.

The high-molecular-weight compound may be, for example, homopolymers or copolymers of alpha,beta-ethylenically unsaturated monomers, polyesters and polyurethanes.

The (co)polymers of alpha,beta-ethylenically unsaturated monomers may be prepared from at least one monomer selected from monomers to be described hereinbelow. Carboxyl-free monomers are preferred.

The polyesters may be, for example, ionomer-type aqueous aromatic polyesters, typically FINEX ES series produced by Dainippon Ink and Chemicals, Inc.

The polyurethanes may be, for example, ionomer-type or water-dispersible polyether polyurethanes or polyester polyurethanes. Typical examles are HYDRAN HW SERIES AND VONDIC series produced by Dainippon Ink and Chemicals, Inc.

The suitable weight average molecular weight of the high-molecular-weight compound is 20,000 to 2,000,000, preferably 200,000 to 1,500,000. If this molecular weight is lower than 20,000, the final emulsion polymer particles have lowered durability characteristics, for example lowered water resistance, when used as a pigment or a filler. If it exceeds 2,000,000, the seed polymer is extremely difficult to plasticize by the film-forming aid and to swell by absorption of the polymerizable unsaturated monomer. Hence, molecular weights outside the specified range are undesirable.

THe term "film-forming aid", as used herein, generically denotes film-forming aids, plasticizers and specific solvents which have been used heretofore in preparing water-base paints.

Typical examples of the film-forming aids include ethylene glycol or its ether-type, ester-type or etherester-type derivatives such as ethylene glycol, methyl Cellosolve, ethyl Cellosolve, butyl Cellosolve, methyl Cellosolve acetate, ethyl Cellosolve acetate, butyl Cellosolve acetate, ethylene glycol monoacetate and ethylene glycol diacetate; diethylene glycol or its ether-type, ester-type or etherester-type derivatives such as diethylene glycol, methylcarbitol, ethylcarbitol, butylcarbitol, methylcarbitol acetate, ethylcarbitol acetate and butylcarbitol acetate; unsubstituted or alkyl-substituted glycols having 3 to 8 carbon atoms or their ether-type, ester-type or etherester-type derivatives such as 2-methyl-2,4-pentanediol, 2,2,4-trimethyl-1,3-pentanediol monoisobutyrate and 2,2,4-trimethyl-1,3-pentanediol isobutyrate; glycerol or its derivatives such as glecerol acetate (also called acetin); unsubstituted or alkyl-substituted aromatic alcohols such as benzyl alcohol and isopropyl benzyl alcohol; and esters of aromatic polycarboxylic acids such as dibutyl phthalate and dioctyl phthalate. At least one of these may be used as the film-forming aids.

The suitable molecular weight of the film-forming aid is in the range of 62 to 1,000, preferably 100 to 800.

In the present invention, the use of unsubstituted or alkyl-substituted monoalcohols such as 2-ethylhexanol or n-octanol and ketones such as methyl ethyl ketone, methyl isobutyl ketone or methyl amyl ketone is not desirable because it induces occurrence of flocs, but the combined use of these with the aforesaid film-forming aids is not prohibited.

The suitable amount of the film-forming aid is 0.1 to 10.0% by weight, preferably 0.2 to 8% by weight, based on the solids of the emulsion polymer finally obtained.

The film-forming aid may be added at any desired time, for examle as shown below.

(1) It is fed into the aqueous phase prior to emulsion polymerization for obtaining the emulsion polymerization dispersion (seed emulsion).

(2) It is fed, either alone or together with the polymerizble unsaturated monomer, in a step of polymerization performed after adding the polymerizable unsaturated monomer to the above seed emulsion.

(3) It is fed in both of the above steps (1) and (2).

The emulsion polymerization finally obtained by the method of this invention is desirably a multilayered polymer having three or more layers. In order to obtain such a polymer, it is possible to perform polymerization in the presence of the film-forming aid in the aqueous phase and/or the polymerizable unsaturated monomer in the stage of obtaining each layer. Preferably, an inner layer is formed in the presence of the film-forming aid to obtain a swollen inside layer, and then an outside layer is provided by polymerization.

Examples of the polymerizable unsaturated monomer used to obtain the emulsion polymer particles in the method of this invention include carboxyl-containing vinyl monomers and unsaturated dicarboxylic acids typified by unsaturated group-containing hydroxyalkyl esthers of monocarboxylic acids such as adducts of (meth)acrylic acid, crotonic acid, maleic acid, fumaric acid, itaconic acid, citraconic acid or an acid anhydride group-containing monomer (such as maleic anhydride or itaconic anhydride) with glycols; and alpha,beta-ethylenicaly unsaturated carboxylic acids such as the aforesaid acid anhydride group-containing monomers mentioned above. These monomers may be used singly or in combination.

Other examles of the polymerizable unsaturated monomer are alkyl esters of (meth)acrylic acid having a linear, branched or cyclic alkyl group with 1 to 8 carbon atoms such as methyl(meth)acrylate, ethyl(meth)acrylate, butyl(meth)acrylate, 2-ethylhexyl(meth)acrylate or cyclohexyl(meth)acrylate; and aromatic vinyl monomers such as styrene, alpha-methylstyrene, p-tert-butylstyrene, p-methylstyrene and vinyltouene. They may be used ether singly or in combination.

Still other examples of the polymerizable unsaturated monomer include hydroxyalkyl esters of (meth)acrylic acid such as 2-hydroxytehyl (meth)acrylate, 2-hydroxypropyl (meth)acrylate, 3-hydroxypropyl (meth)acrylate, 2-hydroxybutyl (meth)acrylate, 3-hydroxybutyl (meth)acrlate, 4-hydroxybutyl (meth)acrylate, 3-chloro-2-hydroxypropyl (meth)acrylate and polyethylene glycol mono(meth)acrylate; unsaturated group-containing polyhydroxyalkyl esters typified by dihydroxyalkyl esters of the aforesaid unsaturated dicarboxylic acids; and hydroxyl-containing vinyl monomers such as hydroxyvinyl ether and hydroxyalkyl vinyl ethers.

Further examples of the polymerizable unsaturated polymerizable unsaturated monomer include substituted or unsubstituted aromatic ring-containing (meth)acrylic acid esters such as benzyl (meth)acrylate; esters formed between the aforesaid unsaturated dicarboxylic acids and monohydric alcohols; vinyl esters such as vinyl acetate, vinyl benzoate and "Veoba" (vinyl ester produced by Shell Chemical Co. of Netherlands); perfluoroalkyl group-containing vinyl esters such as octafluorobutyl (meth)acrylate, trifluoromethyl (meth)acrylate, per-fluorocyclohexyl (meth)acrylate, diperfluorocyclohexyl fumarate and N-isopropyl perfluorooctanesulfonamidoethyl (meth)acrylate; olefins such as vinyl chloride, vinylidene chloride, vinyl fluoride, vinylidene fluoride, chlorotrifluoroethylene, ethylene and propylene; monomers containing carboxylic acid amide groups such as (meth)acrylamide, N,N-dimethyl (meth)acrylamide, N-alkoxymethylated (meth)acrylamide, diacetone acrylamide and N-methylol (meth)acrylamide; monomers containing a sulfonamide group such as p-styrenesulfonamide, N-methyl-p-styrenesulfonamide and N,N-dimethyl-p- styrenesulfonamide; monomers having a tertiary amino group, for example N,N-dialkylaminoalkyl (meth)acrylates such as N,N-diethylaminoethyl (meth)acrylate, and adducts formed between the aforesaid acid anhydride group-containing monomers and compounds having both an active hydrogen atom and a tertiary amino group capable of reacting with the acid anhydride group; cyano group-containing monomers such as (meth)acrylonitrile; phosphoric ester group-containing monomers obtained by condensation reaction of the aforeasid hydroxylakyl esters of (meth)acrylic acid with phosphoric acid or its derivative; and sulfonic acid group-containing monomers such as 2-acrylamide-2-methylpropanesulfonic acid or organic amine salts thereof.

In order to improve the durability and solvent resistance of the final emulsion polymer particles, a crosslinkable monomer may be used in providing the outermost layer by emulsion polymerization. Typical examples of the crosslinkable monomer include monomers having at least two polymerizable unsaturated groups in the molecule, such as ethylene glycol di(meth)acrylate, propylene glycol di(meth)acylate, trimethylolpropane tri(meth)acrylate, divinylbenzene, trivinylbenzene and diallyl phthalate; and monmers having a hydrolyzable silyl group, such as vinyltriethoxysilange, gamma-(meth)acryloyloxypropyltrimethoxysilane, gamma-(meth)acryloyloxypropylmethyldimethoxysilane, gamme-(meth)acryloyloxypropyltriethoxysilane and gamma-(meth)acryloyloxypropylmethyldiethoxysilane.

Additives to be described below may be used in performing the emulsion polymerization by the method of this invention.

Anionic emulsifiers, nonionic emulsifiers, cationic emulsifiers, other reactive emulsfiers, and substances having surface activating ability such as acrylic oligomes may be used as emulsifers in the method of this invention. The use of nonionic emulsfiers and anionic emulsifiers is desirable because it permits perparation of a stable emulsion with little formation of an aggregate or a coagulum during the polymerization.

Typical examles of the nonionic emulsifiers are polyoxyethylene alkyl phenyl ethers, polyoxyethylene alkl ethers, polyoxyethylene higher fatty acid esters and an ethylene oxide/propylene oxide block copolymer. Typical examples of the anionic emulsifiers include alkali metal salts of alkylbenzenesulfonic acids, alkali metal salts of alkyl sulfates and alkali metal salts of polyoxyethylene alkyl pheny sulfates.

Water-soluble oligomers composed of polycarboxylic acid salts or polysulfonic acid salts may be used instead of, or in combination with, the aforesaid anionic emulsifiers.

Water-soluble polymeric substances such as polyvinyl alcohol or hydroxyethyl cellulose may be used as protective colloids. The use of such a protective collid easily leads to emulsion particles having a large particle diameter, but results in a degradation in the water resistance of a film or the like containing the resulting emulsion polymer particles. Accordingly, the amount of the protective colloid should be limited to not more than 5% by weight, preferably not more than 2% by weight, based on the total amount of the polymerizeable unsaturated monomer.

The suitable amount of the emulsifier is about 0.1 to 10% by weight based on the total amount of the monomers.

Any polymerization initiators which are generally used in emulsion polymeriization may be used in this invention without any particular limitation. Typical examples are water-soluble inorganic peroxides such as hydrogen peroxide, persulfates such as potassium persulfate and ammonium persulfate, organic peroxides such as cumene hydroperoxide and benzoyl peroxide, and azo initiators such as azobisisobutyronitrile and azobiscyanovaleric acid. They may be used singly or in combination. Use of two or more water-soluble polymerization initiators having different half-lives is especially effective for synthesis of an emulsion having a large particle diameter.

THe suitable amount of the polymerization initiator is 0.1 to 2% by weight based on the total amount of the polymerizable monomer.

Of course, it is possible to use a so-called redox polymerization technique involving use of a combination of the polymerization initiator and a metallic ion or a reducing agent in the method of this invention.

In performing the method of this invention, at least one of the polymerizable monomers is added to a reactor at a time, portionwise, or continuously in the presence of water preferably in the copresence of deionized water and the emulsifier. Furthermore, the polymerization initiator is added, and the mixutre is heated at a temperature of 0° to 100° C., preferably 30° to 90° C. to give an emulsion polymer containing emulsion particles (seed polymer) as an inside layer capable of being easily swollen with the film-forming aid and the monomer.

Then, the above polumerizable monomer in an amount 1.5 to 9.5 times the total volume of the solids of the seed polymer is added to the emulsion polymer (seed emulsion) containing preferably 10 to 100% by weight of the seed polymer so as to cause it to be absorbed by the seed polymer. The abosrbed polymerizable monomer is then polymerized int eh presence of the film-forming aid. The polymerizable monomer may be added to the seed emulsion and polymerized, either together with the film-forming aid or in the emulsified state. Preferably, the film-forming aid is first added to the seed emulsion, and the polymerizable monomer is added and polymerized. Desirably, the polymerizable monomer is added after the lapse of at least 30 minutes from the addition of the film-forming aid. The monomer is desirably polymerized after it is aged for at least 30 minutes from the addition.

The foregoing procedure may be repeated a number of times required for obtaining the desired particle diameter.

As stated above, the aforesaid crosslinkable monomer is preferably used in order to form the outermost layer. THis improves the water reistance and durability of the finally obtained large-diameter particles.

Preferably, the (co)polymer constituting the outermost layer has a glass transition temperature of at least 40° C., preferably 50° to 250° C.

According to this invention, the use of the film-forming aid faciliates absorption of the polymerizable unsaturated monomer in the seed particles and swelling of the seed particles, and makes it easy to form particles of a large particle diameter. Consequently, particles of a highly monodisperse emulsion polymer having a large diameter can be obtained in less process steps.

Furthermore, according to the present invention, new particles which are particles other than the desired emulsion polymer particles do not appreciably form. Hence, the seed particles themselves grow efficiently to give highly monodisperse particles having a narrow particle size distribution. The suitable final solids concentration is 5 to 65% by weight, especially 10 to 65% by weight, and the suitable particle diameter of the finally obtained emulsion particles is usually within the range of 1.0 to 20.0 microns.

The polymer emulsion of a large particle diameter obtained by the method of this invention can be powderized by a conventional drying method, for example by spray drying at 100° to 250° C., tray drying or vat drying at 50° to 70° C., or fluidized bed drying. The resin powder obtained by spray-drying generally consists of agglomerates (secondary particles) of primary particles (particles in emulsion state), and are completely spherical.

The emulsion polymer obtained by the method of this invention may be used, for example, in the field of water-base paints as a pigment or filler, or in the field of coating agents such ass coating agents or surface-finishing agents for paper or fibers in combination with suitable binders. A powder of the emulsion polymer may be used, for example, as a matt agent for solvent-base paints, a rheology controlling agent, a filler for molding resins, light-weight fillers, a lubricant for cosmetics or a carrier for a latex diagnostic agent.

The following examples illustrate the present invention more specifically. All parts and percentages in these examples are by weight unless otherwise specified. All reactions described below were carried out in a nitrogen gas atmosphere.

EXAMPLE 1

Deionized water (350 parts), 0.230 part of sodium polyoxyethylene alkyl phenyl ether sulfate and 100 parts of styrene were introduced into a reactor equipped with a stirrer, a reflux condenser, a dropping funnel and a thermometer, and well stirred. The reactor was then heated to maintain its inside at 70° C. A mixture of 0.5 part of ammonium persulfate and 25 parts of deionized water was added ddropwise over 5 hours and the mixture was maintained at this temperature for 1 hour. The reaction mixture was then cooled to give a seed emulsion (M-1) of a high-molecular-weight compound having a weight average molecular weight, measured by gel permeation chromatography using tetrahydrofuran as a solvent, of 380,000 (hereinafter, the weight average molecular weights were measured by the same method). The seed emulsion (M-1) had a solids concentration of 21.2%, a pH of 2.5 and an average particle diameter (measured by Coulter Model N4 of Coulter Co. (same hereinafter)), of 0.28 microns.

Sodium polyoxyethylene alkyl phenyl ether sulfate (0.115 aprt) was added to 47.2 parts of the seed emulsion (M-1). Further, 2.0 parts of 2,2,4-trimethyl-1,3-pentanediol monoisiobutyrate (to be referred to as Texanol hereinafter) and 370 parts of deionized water were added. The mixture was well stirred at 30° to 40° C. for 1 hour to permit Texanol to be absorbed by the seed polymer. Thereafter, the mixture was heated to 50° C., and 85 parts of styrene and 5 parts of divinylbenzene were added. The mixture was stirred for 2 hours. The reactor was further heated to maintain its inside at 70° C., and a mixture of 0.5 part of ammonium persulfate and 25 parts of deionized water was added drowise over 5 hours. The mixture was further maintained at this temperature for 1 hour, and then cooled to give an emulsion (A-1). The emulsion (A-1) was a dispersion of monodisperse gelled particles having a solids concentration of 18.5%, a pH of 2.6, and an average particle diameter of 1.05 microns.

EXAMPLE 2

Deionized water (250.3 parts), 0.352 part of sodium laurylsulfate and 100 parts of styrene were introduced into a reactor equippdw ith a stirrer, a reflux ondenser, a thermometer, and a dropping funnel, and well stirred. The reactor was then heated to maintain its inside at 80° C. A mixture of 0.25 part of ammonium persulfate and 25 parts of deionized water was added dropwise over 2.5 hours and further maintained at this temperature for 1 hour. The reaction mixture was then cooled to give a seed emulsion (M-2) of a high-molecular-weight compound having a weight average molecular weight of 410,000. The seed emulsion had a solids concentration of 25.1%, a pH of 2.3 and an average particle diameter of 0.26 microns.

Sodium laurylsulfate (0.152 part), 3.0 parts of butylcarbitol acetate and 450.8 parts of deionized water were added to 59.8 parts of the seed emulsion (M-2). The mixture was well stirred at 30° to 40° C. for 1 hour to permit absorption of butylcarbitol acetate in the seed polymer. The mixture was heated to 50° C., and 85 partss of styrene was added. The mixture was stirred for 2 hours. The reactor was further heated to maintain its inside at 70° C., and a mixture of 0.25 part of ammonium persulfate and 25 parts of deionizd water was added dropwise over 2.5 hours. The reactor was further heated to maintain its inside at 80° C. A mixture of 0.25 part of potassium pesulfate and 25 parts of deionized water was added dropwise. The mixture was further maintained at this temperature for 1 hour, and then cooled to give a seed emulsion (M-3) of a high-molecular-weight compound having a molecular weight of 650,000. The seed emulsion (M-3) had a solids concentration of 17.8%, a pH of 2.3, and an average particle diameter of 0.86 micron.

Sodium laurylsulfate (0.136 part), 1.0 part of butylcarbitol acetate and 485 parts of deionized water were added to 56.2 parts of the seed emulsion (M-3). The mixture was well stirred at 30° to 40° C. for 1 hour, and then heated to 50° C. A mixture of 85 parts of styrene and 5 parts of divinylbenzene was added, and the mixture was stirred for 2 hours. While maintaining the inside of the reactor at 70° C., a mixture of 0.25 part of ammonium persulfate and 25 parts of deionized water was added dropwise over 2.5 hours. The reactor was then further heated to maintain its inside at 80° C. A mixture of 0.25 part of potassium persulfate and 25 parts of deionized water was added dropwise over 2.5 hours. The mixture was maintained at this temperature for 1 hour, and then cooled to give an emulsion (A-2) which was a dispersion of monodisperse gel particles having a solids concentration of 14.7%, a pH of 2.5 and an average particle diameter of 3.28 microns.

EXAMPLE 3

Deionized water (302.5 parts), 0.238 part of sodium larurylbenezenesulfate and 100 parts of styrene were introduced into a reactor equipped with a stirrer, a reflux condenser, a dropping funnel and a thermometer, and well stirred. Then, the reactor was heated to maintain its inside at 70° C. A mixture of 0.5 parat of potassium persulfate and 50 parts of deionized water was added dropwise over 5 hours. The reactor was then further heated and maintained at 80° C. for 1 hour. It was then coold to give a seed emulsion (M-4) of a highmolecular-weight compound having a molecular weight of 320,000. This seed emulsion had a solids concentration of 22.2%, a pH of 2.5 and an average particle diameter of 0.27 micron.

Sodium laurylbenzenesulfate 0.108 part), 4.0 parts of butyl Cellosolve and 358 parts of deionized water were added to 90.1 parts of the seed emulsion (M-4). The mixture was well stirred at 30° to 40° C. for 1 hour and heated to 50° C. Styrene (80 parts) was added, and the mixture was stirred for 2 hours. The reactor was further heated to maintain its inside at 70° C., and a mixture of 0.5 part of potassium persulfate and 50 parts of deionized water was added dropwise over 5 hours. The reactor was further heated and maintained at 80° C. for 1 hour. It was then cooled to give a seed emulsion (M-5) of a high-molcular-weight compound having a molcular weight of 580,000. The seed emulsion (M-5) had a solids concentration of 17.3%, a pH of 2.4 and an average particle diameter of 0.75 micron.

Sodium laurylbenzenesulfate (0.108 part), 3.0 parts of butyl Cellosolve and 363 parts of deionized water were added to 86.7 parts of the seed emulsion (M-5), and the mixture was well stirred. The mixture was stirred at 30° to 40° C. for 1 hour, and heated to 50° C. Styrene (85 parts) was added and the mixture was stirred for 2 hours to permit absorption of the styrene monomer efficiently in the seed particles. The reactor was further heated to maintain its inside at 70° C. A mixture of 0.5 part of potassium persulfate and 50 parts of deionized water was added dropwise over 5 hours. The reactor was further heated at its inside was maintained at 80° C. for 1 hour. The reactor was then cooled to give a seed emulsion (M-6) of a high-molecular-weight compound having a molecular weight of 950,000. The sed emulsion (M-6) had a solids concentration of 17.1%, a pH of 2.5 and an average particle diameter of 2.35 microns.

Sodium laurylbenzenesulfonate (0.108 part), 1.0 part of butyl Cellosolve and 420 parts of deionized water were added to 58.5 parts of the seed emulsion (M-6). The mixture was well stirred at 30° to 40° C. for 1 hour, and then heated to 50° mC. Styrene (85 parts) and 5 parts of divinylbenzene were added to the mixture, and the mixture was maintained at 50° C. for 2 hours. While maintaining the inside of the reactor at 70° C., a mixture of 0.5 part of potassium persulfate and 50 parts of deionized water was added over 5 hours. The inside of the reactor was then heated to 80° C., and maintained at this temperature for 1 hour. The reactor was then cooled to given an emulsion (A-3). The emulsion (A-3) is a dispersion of monodisperse gel particles having a solids conentration of 16.2%, a pH of 2.8 and an average particle diameter of 6.80 microns.

EXAMPLE 4

Sodium laurylbenzenesulfontae (0.108 part), 1.0 part of Texanol and 420 parts of deionized water were added to 58.5 parts of the sed emulsion (M-6) obtained in Example 3. The mixture was well stirred, maintained at 30° to 4° C. for 1 hour, and heated to 50° C. A mixture of 60 parts of styrene, 25 parts of n-butyl acrylate and 5 parts of divinylbenzene was added, and the resulting mixture was maintained at 50° C. for 2 hours. The reactor was then further heated to maintain its inside at 70° C. A mixture of 0.5 part of potassium persulfate and 50 parts of deionized water was added over 5 hours. The reactor was further heated and maintained at 80° C. for 1 hour. It was then cooled to give an emulsion (A-4). The emulsion (A-4) was a dispersion of monodisperse gel particles having a solids concentration of 16.25, a pH of 2.5 and an average particle diameter of 6.52 microns.

COMPARATIVE EXAMPLE 1

For comparison, an emulsion (B-1) was prepared in the same was as in Example 1 except the Texanol was not used. The emulsion (B-1) had a solids concentration of 18.9%, a pH of 2.5 and an average particle diameter of 0.58 micron.

COMARATIVE EXAMPLE 2

For comparison, an emulsion (B-2) was prepared in the same way as in Example 1 except that 10 parts, as solids of a polystyrene emulsion having a particle diameter of 0.25 micron and a molecular weight of 3,000 was used as the seed emulsion; Texanol was not used; and that styrene was used as the monomer. The emulsion (B-2) had a solids concentration of 18.6%, a pH of 2.4 and an average particle diameter of 0.75 micron.

COMPARATIVE EXAMPLE 3

For comparison, an emulsion (B-3) was prepared in the same was as in Example 1 except that 10 parts, as solids. of polystyrene gel particles having a particle diameter of 0.25 micron was used as the seed emulsion, and Texanol was not used. The emulsion (B-3) had a solids concentration of 18.7%, a pH of 2.6 and an average particle diameter of 0.48 micron.

COMPARATIVE EXAMPLE 4

For comparison, an emulsion (B-4) was prepared in the same was as in Example 1 except that in the second step, Texanol was not used, but a mixture of 85 parts of styrene and 5 parts of divinylbenzene was added dropwise over 5 hours simultaneously with the addition of the initiator solution. The emulsion (B-4) had a solids concentration of 18.6%, a pH of 2.4 and an average particle diameter of 0.58 micron.

APPLICATION EXAMPLES 1-3 AND COMPARATIVE APPLICATION EXAMPLES 1-4

Each of the emulsions (A-1) to (A-3) and (B-1) to (B-4) obtained in the foregoing Examples and Comparative Examles was mixed with a binder and a thickener (hydroxyethyl cellulose) in the amounts indicated in Table 1. The mixture was stirred to a constant viscosity to form a paint. The paint was coated on a glass plate by a 6-mil applicator, and dried at room temperature for 1 day. The 60° and 75° glosses and water resistance of the coated film were evaluated in the initial stage and after drying and rubbing.

The binder used was an emulsion having a nonvolatile content of 50% obtained by emulsion polymerization of a monomeric mixture composed mainly of methyl methacrylate and 2-ethylhexyl acrylate in a customary manner.

TABLE 1

| Type | Average (*1) particle diameter | Application Example | | | Comparative Application Example | | | |
|---|---|---|---|---|---|---|---|---|
| | | 1 | 2 | 3 | 1 | 2 | 3 | 4 |
| Emulsion | | | | | | | | |
| A-1 | 1.05 | 101.4 | | | | | | |

TABLE 1-continued

| Type | Average (*1) particle diameter | Application Example 1 | Application Example 2 | Application Example 3 | Comparative Application Example 1 | Comparative Application Example 2 | Comparative Application Example 3 | Comparative Application Example 4 |
|---|---|---|---|---|---|---|---|---|
| A-2 | 3.28 | | 127.6 | | | | | |
| A-3 | 6.80 | | | 115.7 | | | | |
| B-1 | 0.58 | | | | 199.2 | | | |
| B-2 | 0.75 | | | | | 100.8 | | |
| B-3 | 0.48 | | | | | | 100.3 | |
| B-4 | 0.58 | | | | | | | 100.8 |
| Binder (50%) | | 150 | 150 | 150 | 150 | 150 | 150 | 150 |
| Hydroxyethyl cellulose | | 0.65 | 0.65 | 0.65 | 0.65 | 0.65 | 0.65 | 0.65 |
| Water | | 62.6 | 16.4 | 48.3 | 64.8 | 63.2 | 63.7 | 63.2 |
| Non-volatile content (wt. %) | | 30 | 30 | 30 | 30 | 30 | 30 | 30 |
| PVC (%) (*2) | | 20 | 20 | 20 | 20 | 20 | 20 | 20 |
| Properties of the film | | | | | | | | |
| Gloss (*3) Initial stage 60° | | 3.8 | 1.5 | 1.3 | 25.3 | 14.5 | 50.5 | 24.8 |
| 75° | | 1.5 | 1.1 | 0.9 | 12.5 | 7.1 | 26.3 | 13.2 |
| After drying and rubbing (*4) 60° | | 2.0 | 1.7 | 1.5 | 30.6 | 20.7 | 56.7 | 30.2 |
| 75° | | 1.1 | 1.3 | 1.2 | 15.7 | 10.9 | 29.3 | 16.2 |
| Water resistance (*5) | | O | O | O | O | X | O | O |

Notes to Table 1
(*1): Weight average particle diameter in microns measured by a Coulter Model N4.
(*2): Pigment volume concentration (% by volume) when the specific gravity of the solids of the binder and the non-film-forming fine polymer particles is taken as 1.
(*3): Measured by a Murakami-type gloss meter.
(*4): Gloss measured after 200 cyles of rubbing after drying.
(*5): The coated film was immersed for 1 week in a constant temperature water tank at 30° C., and then observed for blisters. The result was rated on the following standards.
O: No blister occurred at all.
X: Blisters markely occurred.

As shown in Table 1, the emulsion particles obtained by the method of this invention, when mixed with a suitable binder and coated, gives a coated film having a good matting effect and high water resistance. When the coated film is viewed at an angle of 15 degrees to a horizontal surface, it also shows a good matting effect.

What is claimed is:

1. A method of producing an emulsion polymer which comprises adding a polymerizable unsaturated monomer to an emulsion polymer comprising a high-molecular-weight compound not containing a polyfunctional cross-linkable monomer or a chain transfer agent and having a weight average molecular weight of 20,000 to 2,000,000 as a seed polymer, the amount of the unsaturated monomer being 1.5 to 0.5 times the total volume of the solids in the emulsion polymer, and thereafter, polymerizing the monomer in the presence of a film-forming aid which is at least one compound selected from the group consisting of ethylene glycol, ether, ester or etherester derivatives of ethylene glycol, glycols having 3 to 8 carbon atoms, alkyl-substituted $C_3$-$C_8$ glycols, ether, ester or etherester derivatives of said glycols, diethylene glycol, ether, ester or etherester derivatives of diethylene glycol, glycerol, glycerol derivatives, aromatic alcohols, substituted aromatic alcohols, aromatic polycarboxylic acid esters, and alkyl-substituted aromatic polycarboxylic acid esters.

2. The method of claim 1 wherein the seed polymer is a homopolymer or copolymer of an alpha,beta-ethylenically unsaturated monomer.

3. The method of claim 1 wherein the seed polymar is a polyester.

4. The method of claim 1 wherein the seed polymer is a polyurethane.

5. The method of claim 1 wherein the seed polymer is a homopolymer or copolymer of an alpha,beta-ethylenically unsaturated monomer free from a carboxyl group.

6. The method of claim 1 wherein the emulsion polymer finally obtained has an average particle diameter of 1.0 to 20.0 microns.

7. The method of claim 1 which comprises adding a polymerizable aromatic vinyl monomer to an emulsion seed polymer which is a homopolymer or copolymer of an alpha,beta-ethylenically unsaturated monomer having a weight average molecular weight in the range of from 200,000 to 1,500,000, wherein the amount of the aromatic vinyl monomer is from 1.5 to 9.5 times the total volume of the solids in the emulsion polymer, and thereafter, polymerizing the aromatic vinyl monomer in the presence of from 0.1 to 10.0% by weight, based on the solids of the emulsion polymer finally obtaind, of a film-forming aid selected from the group consisting of ester derivatives of ethylene glycol, ester derivatives of diethylene glycol, ester derivatives of glycols having 3 to 8 carbon atoms, and mixtures thereof.

8. The method of claim 7 wherein the aromatic vinyl monomer is selected from the group consisting of styrene, alpha-methyllstyrene, p-tert-butylstyrene, p-methylstyrenen and vinyltoluene, or mixtures thereof.

9. The method of claim 1 wherein the high-molecular-weight compound has a weight average molecular weight of from 200,000 to 1,500,000.

10. The method of claim 1 wherein the film-forming aid is at least one compound selected from the group consisting of ethylene glycol, methyl Cellosolve, ethyl Cellosolve, butyl Cellosolve, methyl Cellosolve acetate, ethyl Cellosolve acetate, butyl Cellosolve acetate, ethylene glycol monoacetate, ethylene glycol diacetate, diethylene glycol, methylcarbitol, ethylcarbitol, butylcarbitol, methycarbitol acetate, ethylcarbitol acetate, butylcarbitol acetate, 2-methy-2,4-pentanediol, 2,2,4-trimethyl-1,3-entanediol monoisobutyrate, 2,2,4-trimethyl-1,3-pentanediol isobutyrate, glycerol glycerol acetate, benzyl alcohol, isopropyl benzyl aocohol, dibutyl phthalate and dioctyl phthalate.

11. The method of claim 1 wherein the film-forming aid has a molecular weight in the range of from about 100 to 800.

12. The method of claim 1 wherein the film-forming aid is used in an amount of 0.2 to 8% by weight, based on the solids of the emulsion polymer finally obtained.

13. The method of claim 1 wherein the film-forming aid is added to the emulsion polymer prior to the addition of the polymerizable monomer.

14. The method of claim 1 wherein the film-forming aid is added to the emulsion polymer after the polymerizable monomer is added to the emulsion polymer but before the step of polymerizing the polymerizable monomer.

15. The method of claim 1 wherein the film-forming aid and polymerizable monomer are added together to the emulsion polymer.

16. The method of claim 1 wherein polymerizabe monomer is added in at least two different steps to form a multi-layer emulsion polymer.

17. The method of claim 16 wherein the outermost layer of the emulsion polymer is formed by emulsion polymerization of a cross-linkable monomer.

* * * * *

UNITED STATES PATENT AND TRADEMARK OFFICE
CERTIFICATE OF CORRECTION

PATENT NO. : 4,914,142

DATED : April 3, 1990

INVENTOR(S) : KUNIHIDE TAKARABE ET AL.

It is certified that error appears in the above-identified patent and that said Letters Patent is hereby corrected as shown below:

Column 11, line 43, "0.5" should read --9.5--.

Column 11, line 59, "polymar" should read --polymer--.

Column 12, line 41, "obtaind" should read --obtained--.

Column 12, line 48, "alpha-methyllstyrene" should read --alpha-methylstyrene--;

Column 12, line 48 & 49 "p-methylstyrenen" should read --p-methylstyrene--.

Column 12 line 61 & 62 "2,2,4-trimethyl-1,3-entanediol" should read --2,2,4-trimethyl-1,3-pentanediol--;

Column 12, line 63, "glycerol glycerol" should read --glycerol, glycerol--;

Column 12, line 64, "aocohol" should read --alcohol--.

Column 14, line 6, "polymerizabe" should read --polymerizable--.

Signed and Sealed this

Thirtieth Day of July, 1991

*Attest:*

HARRY F. MANBECK, JR.

*Attesting Officer*     *Commissioner of Patents and Trademarks*